United States Patent
Bartha et al.

(10) Patent No.: US 6,846,766 B1
(45) Date of Patent: Jan. 25, 2005

(54) CARBONACEOUS REFRACTORY SHAPED BODY WITH IMPROVED OXIDATION BEHAVIOR AND BATCH COMPOSITION AND METHOD FOR PRODUCING THE SAME

(75) Inventors: Peter Bartha, Bovenden (DE); Helge Jansen, Friedland (DE); Heinrich Grosse Daldrup, Meerbusch-Buderich (DE)

(73) Assignee: Refratechnik Holding GmbH, Ismaning (DE)

( * ) Notice: Subject to any disclaimer, the term of this patent is extended or adjusted under 35 U.S.C. 154(b) by 161 days.

(21) Appl. No.: 10/130,350
(22) PCT Filed: Nov. 13, 2000
(86) PCT No.: PCT/EP00/11205

§ 371 (c)(1),
(2), (4) Date: Oct. 1, 2002

(87) PCT Pub. No.: WO01/36346

PCT Pub. Date: May 25, 2001

(30) Foreign Application Priority Data

Nov. 15, 1999 (DE) .......................................... 199 54 893

(51) Int. Cl.$^7$ ............................................. C04B 35/04
(52) U.S. Cl. .......................... 501/99; 501/101; 501/109; 264/29.1
(58) Field of Search .......................... 501/99, 101, 109; 264/29.1

(56) References Cited

U.S. PATENT DOCUMENTS

| 4,248,638 | A | * | 2/1981 | Yomota et al. | |
| 4,292,082 | A | * | 9/1981 | Danjyo et al. | 501/100 |
| 4,957,887 | A | * | 9/1990 | Michael et al. | |
| 5,248,707 | A | * | 9/1993 | Gerber | 523/145 |
| 5,628,939 | A | * | 5/1997 | Reiterer et al. | 264/29.1 |

* cited by examiner

*Primary Examiner*—Paul Marcantoni
(74) *Attorney, Agent, or Firm*—Goodman & Teitelbaum, Esqs.

(57) ABSTRACT

A batch, in particular for the production of a refractory shaped body, includes at least one refractory metal oxide component and a synthetic resin component as a binder, and a graphitizing auxiliary for producing crystalline graphite carbon from the resin. The graphitizing auxiliary originates from a group consisting of reducible organic compounds of transition elements and/or a group of active organic or inorganic metal compounds or metals, such as resin-soluble metal salts, chemically precipitated or micronized metal oxides or metals. The graphitizing auxiliary is available in molecular form over the time and/or temperature range of conversion of the synthetic resin into carbon (carbonization).

43 Claims, 2 Drawing Sheets

Diffractograms for binders carbonized at 1000°C

Fig. 1: Diffractograms for binders carbonized at 1000°C

CARBONACEOUS REFRACTORY SHAPED BODY WITH IMPROVED OXIDATION BEHAVIOR AND BATCH COMPOSITION AND METHOD FOR PRODUCING THE SAME

BACKGROUND OF THE INVENTION

The invention relates to a refractory batch for the production of a shaped body and to a process for its production.

Phenolic resin-bonded or pitch-bonded bricks based on magnesia and other oxides as well as graphite are preferably used to line metallurgical vessels. Very high demands are imposed on the performance of the bricks at application temperatures of up to 1800° C. with aggressive, moving slags.

The wear to refractory bricks in use can be roughly divided into two different mechanisms: firstly, the wear caused by chemical reactions (corrosion and oxidation), and secondly thermomechanical wear (cracks, flaking, fatigue of the brick substance). There are also mixed forms, such as abrasion and erosion. While the chemical stability can be influenced in particular by the choice of raw materials (LC sinter, fused magnesia, flake graphite, etc.), the thermomechanical resistance is determined above all by the bonding. In use, MgO-C bricks in principle have four possible ways of compensating for thermomechanical loads; by elastic deformation, by plastic deformation, by microcracks or by macrocracks in the brick structure. While the elastic component of the deformation is naturally low in coarse ceramic products, macrocracks lead to destruction and loss of brick substance.

Under the high application temperatures in the metallurgical vessels, the binders phenolic resin and coal-tar pitch are carbonized to form carbon. The binder is therefore only a means to an end. However, the nature of the resulting carbon, which is responsible for bonding in the bricks under the high application temperatures, is determined by the binder. The nature of phenolic resin bonding means that it has the drawback, compared to pitch bonding, that the carbon which is formed during carbonization (glassy carbon) is rigid and brittle. Pitch-bonded bricks, with high strengths, have relatively low moduli of elasticity. The primary difference is the crystallinity of the carbon, which in pitch results from the formation of a liquid so-called mesophase. Corresponding structures are produced from the phenolic resin under standard conditions only at temperatures of over 2500° C. Unlike crystalline graphite, glassy carbon bonding in practice offers no way of compensating for excess stresses apart from by macrocracks. The result in practice is a higher sensitivity to thermomechanical stresses and mechanical impact loads. Moreover, the isotropic glassy carbon reacts more readily with oxygen, i.e. is more sensitive to oxidation. In use, this may lead to a more rapid loss of brick substance.

The pitch bonding, which is based on coal-tar pitch, however, has the considerable drawback that, when the pitch and the bricks are heated, carcinogenic substances, such as benzo(a)pyrene, may form, and these substances have to be removed from the brick immediately after they have been produced using complex heat treatment methods. Therefore, pitch bonding is under pressure with regard to health and safety at work and environmental protection. The use of newly developed, alternative pitches originating from petroleum generally leads to a reduction in the performance of the bricks. Therefore, there is a need for bonding with optimum use properties, in particular a high flexibility and resistance to oxidation of the bonding coke, in combination with environmentally compatible emissions during production and use.

It is known from "Chemical Abstracts", Vol. 109, No. 20, Nov. 14, 1988, Abstract No. 1753313e, to add 3–20% by weight of metallic aluminum or aluminum alloy powder and 0.5–7% by weight of chromium oxide powder to resin-bonded magnesia-carbon bricks. This is intended to improve the resistance to oxidation/corrosion.

To accelerate and control the liquid-phase pyrolysis of industrial hydrocarbon mixtures, in particular bonding pitches for refractory shaped bodies, it is known from DE 43 12 396 A1 to add, for example, ferrocene in order to increase the yield of coke. This allows the coke yield to be catalytically increased.

BRIEF SUMMARY OF THE INVENTION

The invention is based on the object of providing a refractory batch and a refractory shaped body which is thermoplastically deformable and, moreover, has an improved oxidation behavior, the positive use properties of the phenolic resin bonding being linked to the good thermomechanical properties and the higher resistance to oxidation of the coal-tar pitch bonding.

The object is achieved by a batch having the features set forth below, a shaped body also having the features set forth below, and also a process which has the features set forth below.

According to the invention, the objects are achieved by the fact that the graphitization of the synthetic resin which is carbonized is achieved by the addition of graphitizing auxiliaries to the binder resin at temperatures of even <1000° C.

BRIEF DESCRIPTION OF THE SEVERAL VIEWS OF THE DRAWINGS

The invention is also explained by way of example by reference to a drawing, in which.

DETAILED DESCRIPTION OF THE INVENTION

The graphitizing auxiliaries according to the invention are in particular readily reducible organic compounds of the transition elements, such as for example metallocenes, metal benzoates, metal octoates and metal naphthenates, or active, optionally inorganic compounds, such as resin-soluble metal salts or chemically precipitated or micronized metal oxides. Preferred metals in this context are Cu, Cr, Fe, Ni or Co. However, metallic graphitizing auxiliaries, such as the abovementioned metals and in particular Ni metal or further metals such as Pt metal, Rh metal, Ge metal or similar or other related metals, are also conceivable. The substances which are active as graphitizing auxiliaries reduce the graphitizing temperatures of 2500° C. which are otherwise customary to below 1000° C., and are added in amounts from 0.1 to 10% by weight, based on the resin. A typical amount is 1%.

The agent is for example dissolved in solvent or added in micronized form as a powder or slurry. The crucial factor is that the elements which act as graphitizing auxiliaries are available in molecular form at the start of the conversion of the synthetic resin into carbon (carbonization) at approx. 400–500° C. This requires an extremely fine, ideally molecular dispersion of the active substance and also reducibility under the conditions in the MgO-C brick. The graphitizing action can no longer be measured at below 0.1%. The agent is dissolved in solvent or is added in micronized form as a powder or slurry.

The graphitization of the synthetic resin can be determined in pure carbonized synthetic resin specimens by X-ray diffraction. Non-graphitized carbon provides only a diffuse, broad peak, while graphitized synthetic resin has the characteristic diffraction spectrum of graphite. The graphitizing auxiliary in the binder matrix of the brick is detected, for example, by EDX scanning of the binder matrix of a microscopic brick specimen on the catalytically active element (e.g. Fe, Ni or Co).

Figure 1:
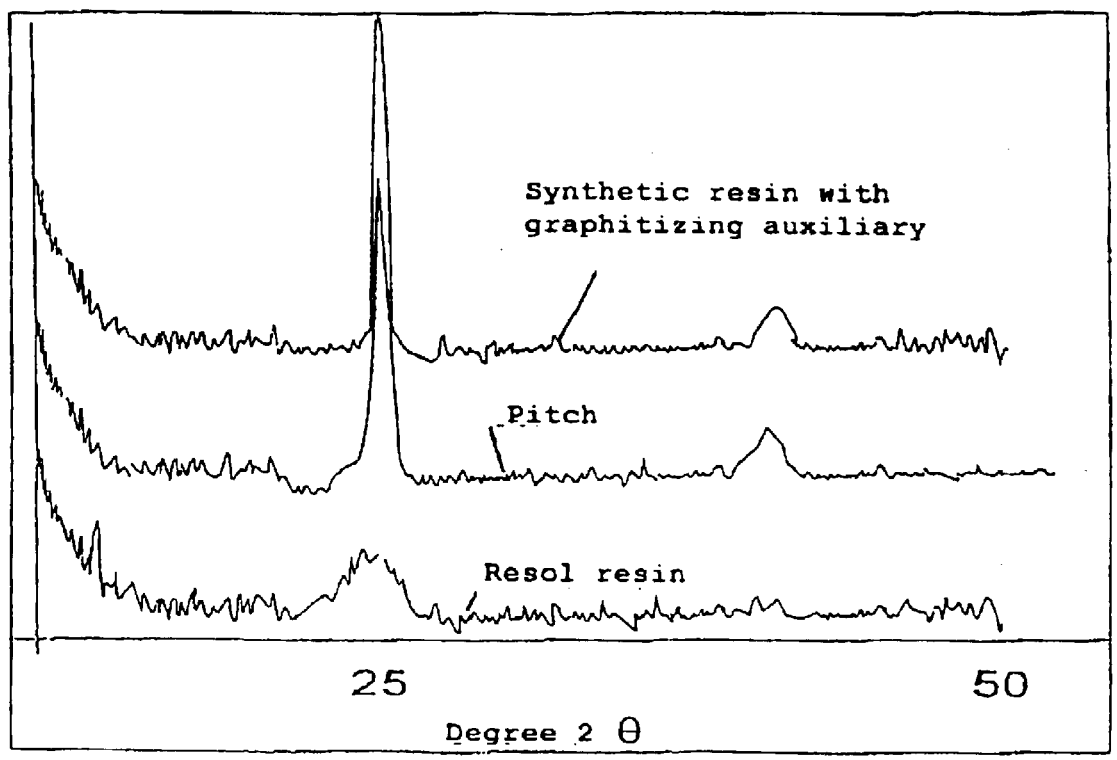
FIG. 1 shows the lines from X-ray diffractograms for carbonized resol resin, pitch and resol resin which has been mixed with a graphitizing auxiliary in accordance with the invention.

FIG. 1 shows the lines from X-ray diffractograms for carbonized resol resin, pitch and resol resin which has been mixed with a graphitizing auxiliary in accordance with the invention. The sharp peak at 25° shows that the catalytic activation leads to crystalline, graphite structures. The carbonized resol resin only reveals what is known as an amorphous hill, indicating a low state of order.

Figure 2:
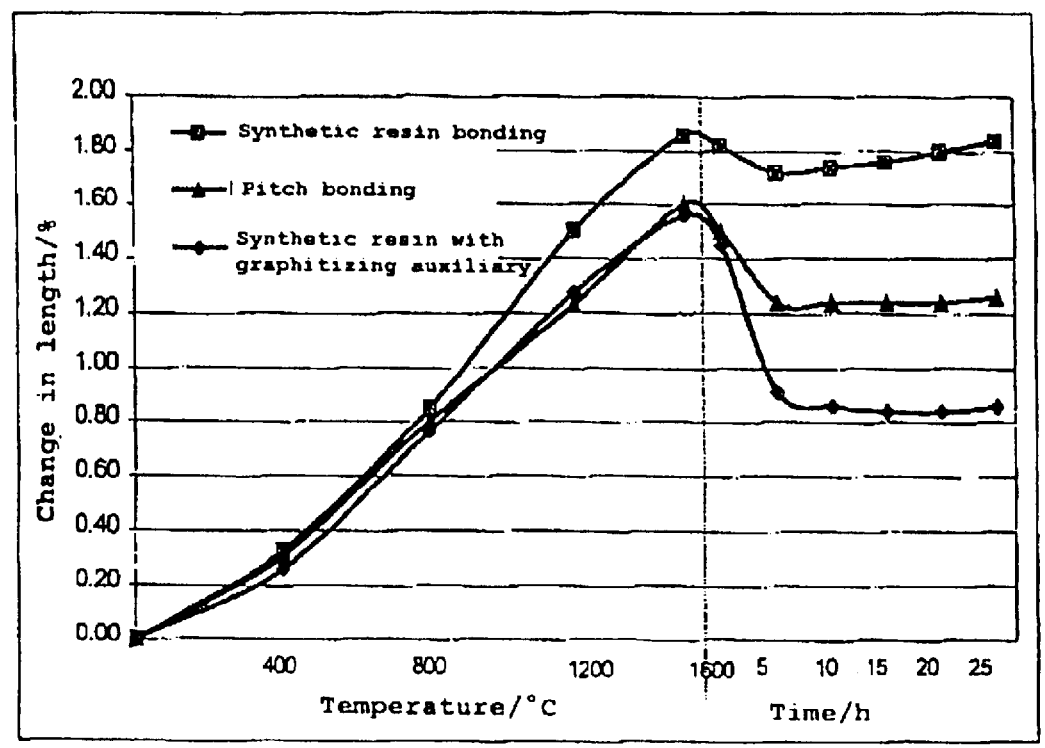
FIG. 2 shows softening under load/compressive flow (SUL/CF) curves under argon.

FIG. 2 shows softening under load/compressive flow (SUL/CF) curves under argon. During the testing of the SUL, the test specimen, which is subjected to a constant load, is heated to the testing temperature and the change in length is measured. The specimen generally grows, on account of thermal expansion. The higher the thermal expansion, the higher the stresses in the brick. In the case of compressive flow, pressure and temperature are kept constant and the deformation is measured as a function of time. If the material has an ability to flow, it is deformed in the opposite direction to the expansion, although further growth, for example on account of reactions taking place and new phases being formed, is also conceivable.

The bonding according to the invention using a graphitized carbonized synthetic resin was produced by adding 1% of ferrocene dissolved in acetone to the novolak resin. The diagram shows that the invention not only leads to lower expansion than standard synthetic resin bonding but also leads to a pronounced ability of the brick to flow. The profile of the curve makes it possible to draw the conclusion that, on account of the lower expansion, stresses not only occur to a reduced extent, but also can be relieved without destruction. The modification therefore leads to a thermoplastic behavior of the refractory shaped body, without the other properties dropping to a level which is below that of bricks with standard resin bonding.

This is also demonstrated by the following table, which compares the properties of bricks with and without bonding which has been graphitized by means of graphitizing auxiliaries (statistical means from the production of approx. 500 t of bricks). Two batches were selected and bricks produced therefrom.

Batch 1: 90% fused magnesia 96, 10% C
Batch 2: 90% fused magnesia 96, 10% C, addition of 1% of micronized ferrocene powder to the batch.

|  | Batch 1 | Batch 2 |
|---|---|---|
| FRD [g/cm$^3$] | 3.06 | 3.06 |
| FRD a.c. [g/cm$^3$] | 2.97 | 3.00 |
| E modulus [GPa] | 48.81 | 56.88 |
| E modulus a.c. [GPa] | 9.20 | 7.73 |
| Open porosity [%] | 4.37 | 3.23 |
| Open porosity a.c. [%] | 11.25 | 10.13 |
| Cold compression strength [MPa] | 51.60 | 58.30 |
| Cold compression strength a.c. [MPa] | 20.10 | 23.10 |
| Cold flexural strength [MPa] | 13.18 | 15.15 |
| Cold flexural strength a.c. [MPa] | 2.48 | 2.87 |
| d max [%] 1550° C. | 1.88 | 1.58 |
| Ability to flow after 10 h [%] 1550° C. | 0.31 | 0.45 |
| d max [%] 1300° C. | 1.53 | 1.46 |
| Ability to flow after 10 h [%] 1300° C. | 0.00 | 0.05 |
| Resistance to oxidation [s/mg] | 19.15 | 22.13 | a.c. = after carbonization

Figure 3:
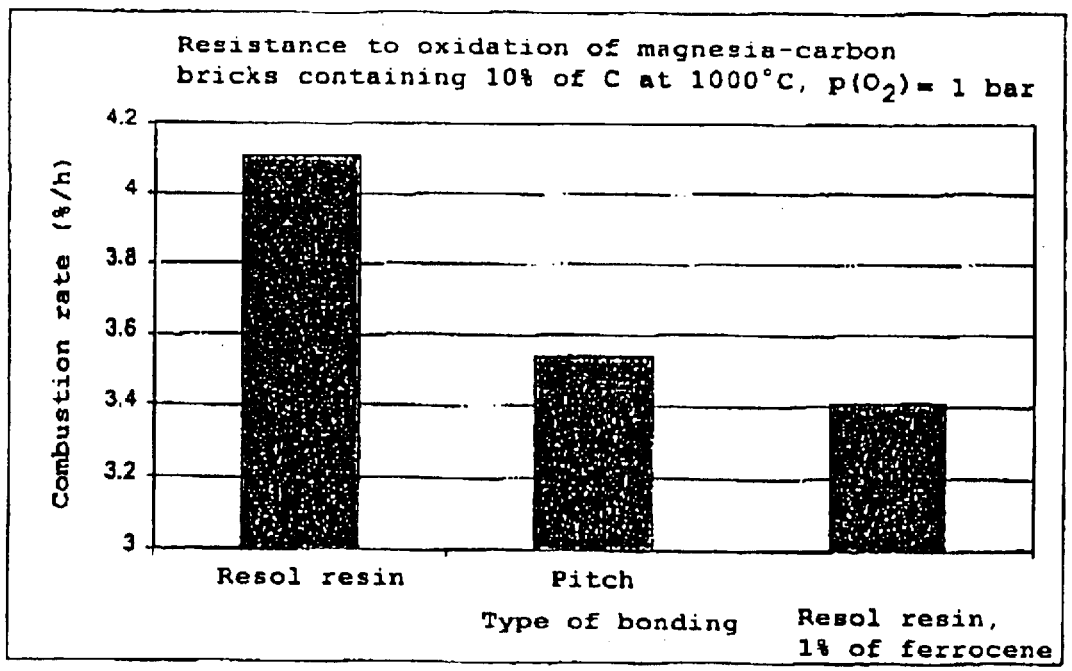
FIG. 3 shows the resistance to oxidation of a shaped body according to the invention compared to known shaped bodies.

In particular the high strengths and low open porisities in combination with the low elastic moduli (E modulus and G moduli) after the formation of the graphite carbon structure at 1000° C. are worthy of note. Furthermore, the formation of a crystalline, graphite structure of the carbon considerably improves the resistance to oxidation, measured as burnoff per unit time under a defined air flow at 1000° C. (thermogravimetry), as shown by FIG. 3.

The invention is to be explained in more detail with reference to two examples.

1. Shaped Body with Ferrocene as Graphitizing Auxiliary

First of all, a micronized MgO-ferrocene preparation is produced by milling an MgO sinter with a grain size of 1–2 mm and ferrocene powder together in a ball mill, in a ratio of 50:1. After the milling, the final grain size of the ferrocene lies in the range of 1–10 $\mu$m and is therefore highly active. The milling takes place in order to open up the ferrocene and allow handling which is easier for metering to the batch.

Further raw materials used are fused magnesia and flake graphite. The batch consists of 34% of fused magnesia of a grain size of 2–4 mm, 22% of fused magnesia of a grain size of 1–2 mm, 20% of fused magnesia of a grain size of 0–1 mm and 12.5% of MgO meal. In addition, the batch includes 10% of flake graphite and 1.5% of MgO-ferrocene preparation. The batch described above is fed to a forced mixer, where it is subjected to dry premixing for three minutes. Then, 3% of phenolic resin are added and mixing is continued for a further 10 minutes. The press batch produced in this way is pressed to form shaped bodies on a hydraulic press under a maximum pressure of 160 MPa. The shaped bodies are then dried for six hours at 200° C., after which they are ready for use.

2. Shaped Body with Fe Pigment as Graphitizing Auxiliary

In this case, Fe pigment is used as graphitizing auxiliary, the Fe pigment which acts as graphitizing auxiliary (red hematite pigment, grain size <10 $\mu$m) being added directly to the resin, as a slip with a solid content of >60%. This pigment suspension is stirred into the resin by means of a stirrer. Homogenization is achieved after approx. five minutes and can be recognized from the fact that the pitch is colored all the way through.

Further raw materials used are once again fused magnesia and flake graphite, with a batch being produced from 34% of fused magnesia with a grain size of 2–4 mm, 22% of fused magnesia with a grain size of 1–2 mm, 20% of fused magnesia with a grain size of 0–1 mm and 14% of MgO meal. 10% of flake graphite are added. These constituents undergo dry premixing for three minutes in a forced mixer. Then, 3% of phenolic resin, of which 1.5% is dispersed Fe pigment suspension, are added to the mixer, whereupon the entire mix undergoes wet-mixing for a further 10 minutes.

This press batch, which is now fully mixed, is likewise pressed into shaped bodies on hydraulic presses using a maximum pressure of 160 MPa, these shaped bodies being dried for six hours at 200° C. after pressing and then being ready for use.

Of course, the ferrocene may also be processed as a suspension and Fe pigment may also be processed as an MgO-Fe pigment preparation. All further graphitizing auxiliaries which have been mentioned and are possible can likewise be processed at least in the two ways which have been described. Moreover, they can be added to the resin or the entire mixture or other individual constituents of the mixture, in the form of a suspension or emulsion in a very wide range of solvents.

An advantage of the of the carbon-containing refractory batch and shaped body according to the invention is that bonding in the batch or shaped body which allows a high degree of flexibility and resistance to oxidation on the part of the bonding carbon is achieved, while avoiding the environmental problems associated with pitch, while the graphitizing temperature is advantageously reduced from over 2000° C. to well below 1000° C.

What is claimed is:

1. A batch, for production of a refractory shaped body, comprising:
    at least one refractory metal oxide component;
    at least one carbon carrier and a synthetic resin component as a binder;
    a graphitizing auxiliary for producing crystalline graphite carbon from the synthetic resin component;
    the graphitizing auxiliary originating selected from the group consisting of reducible organic compounds of transition elements and/or a group of active organic or inorganic metal compounds or metals; and
    the graphitizing auxiliary having a size in molecular form over a time and/or a temperature range of a conversion of the synthetic resin into carbon via carbonization.

2. The batch as claimed in claim 1, wherein the graphitizing auxiliary contains, as reducible organic compounds of the transition elements, metallocenes and/or metal benzoates and/or metal octoates and/or metal naphthenates and/or further organic metal compounds.

3. The batch as claimed in claim 1, wherein the organic compounds are compounds of metals, the metals being copper and/or chromium and/or iron and/or nickel and/or cobalt and/or platinum and/or rhodium and/or germanium.

4. The batch as claimed in claim 1, wherein ferrocene is included as the graphitizing auxiliary.

5. The batch as claimed in claim 1, wherein the graphitizing auxiliary includes inorganic metal compounds, the inorganic metal compounds being resin-soluble metal salts or chemically precipitated or micronized metal oxides or metals.

6. The batch as claimed in claim 1, wherein the graphitizing auxiliary contains, as the inorganic metal compounds, compounds of copper and/or chromium and/or iron and/or nickel and/or cobalt and/or platinum and/or rhodium and/or germanium or contains the metals in metallic form.

7. The batch as claimed in claim 1, wherein the graphitizing auxiliary contains red hematite pigment.

8. The batch as claimed in claim 1, wherein the refractory metal oxide component substantially includes MgO.

9. The batch as claimed in claim 8, wherein the refractory metal oxide component is a high-purity natural or synthetic MgO sinter.

10. The batch as claimed in claim 1, wherein the refractory metal oxide component substantially includes dolomite.

11. The batch as claimed in claim 10, wherein the refractory metal oxide component is a natural or synthetic dolomite sinter.

12. The batch as claimed in claim 1, wherein the refractory metal oxide component is $Al_2O_3$.

13. The batch as claimed in claim 12, wherein the refractory metal oxide component is tabular alumina.

14. The batch as claimed in claim 1, wherein the synthetic resin component includes a single-component synthetic resin.

15. The batch as claimed in claim 1, wherein the synthetic resin component includes a two-component synthetic resin.

16. The batch as claimed in claim 1, which includes antioxidants.

17. The batch as claimed in claim 16, wherein the antioxidants are metallic antioxidants.

18. The batch as claimed in claim 17, wherein the metallic antioxidants are silicon and/or aluminum and/or magnesium.

19. The batch as claimed in claim 1, wherein the refractory metal oxide component has a grain size less than or equal to 10 mm.

20. The batch as claimed in claim 1, wherein the refractory metal oxide component has a grain size distribution less than or equal to 5 mm.

21. The batch as claimed in claim 1, wherein the refractory metal oxide component in the batch is between 70% by mass and 98% by mass.

22. The batch as claimed in claim 1, wherein the binder is a phenolic resin and/or a resol resin and/or a novalak resin.

23. The batch as claimed in claim 1, wherein the synthetic resin component is included in an amount of from 1 to 5% by mass.

24. The batch as claimed in claim 1, wherein the carbon carrier is included in an amount of from 0.5% by mass to 30% by mass.

25. The batch as claimed in claim 17, wherein the metallic antioxidants are included in an amount of from 0.5% to 10%.

26. The batch as claimed in claim 1, wherein the graphitizing auxiliary is included in amounts of from 0.1 to 10% by weight, based on the synthetic resin component.

27. The batch as claimed in claim 26, wherein the graphitizing auxiliary is included in amounts of from 0.5 to 5% by weight, based on the synthetic resin component.

28. The batch as claimed in claim 26, wherein the graphitizing auxiliary is included in amounts of from 0.7 to 1.4% by weight, based on the synthetic resin component.

29. The batch as claimed in claim 1, which includes fibers.

30. The batch as claimed in claim 29, wherein the fibers are steel fibers.

31. The batch as claimed in claim 1, including means for using the batch for producing shaped bodies.

32. The batch as claimed in claim 1, including means for using the batch as a spraying and/or tamping and/or ramming and/or repair compound.

33. A process for producing a shaped body using a batch, comprising:
    classifying and assembling a refractory metal oxide component to have a grain-size range including a plurality of grain fractions;
    mixing the refractory metal oxide component with a carbon carrier and a synthetic resin component as a binder to form a mixture;

adding and mixing a graphitizing auxiliary to the mixture for producing crystalline graphite carbon from the synthetic resin component in the mixture; and pressing and then hardening the mixture.

34. The process as claimed in claim 33, wherein antioxidants are also added to the mixture.

35. The process as claimed in claim 33, wherein the graphitizing auxiliary is added, as a micronized, premilled preparation including the refractory metal oxide component and the graphitizing auxiliary, the premilled preparation being produced by milling the refractory metal oxide component and the graphitizing auxiliary together in a ball mill.

36. The process as claimed in claim 35, wherein, for the premilled preparation, the graphitizing auxiliary and the refractory metal oxide component are mixed in a ratio of 1:50 and are milled together in the ball mill.

37. The process as claimed in claim 36, wherein milling is continued until a final grain size of the graphitizing auxiliary is between one and ten micrometers.

38. The process as claimed in claim 33, wherein the graphitizing auxiliary is added to the mixture as a suspension, emulsion or slip.

39. The process as claimed in claim 33, wherein the graphitizing auxiliary is added to the synthetic resin component prior to mixing with any other constituent.

40. The process as claimed in claim 33, wherein steel fibers and/or pressing auxiliaries are also added.

41. The process as claimed in claim 33, wherein the batch, when fully mixed, is pressed at pressing pressures of up to 180 MPa.

42. The process as claimed in claim 33, wherein the shape bodies, when pressed, are dried and hardened for 4 to 10 hours at 150 to 250.

43. The batch as claimed in claim 1, wherein the group consisting of reducible organic compounds of transition elements includes resin-soluble metal salts; and/or the group of active organic or inorganic metal compounds or metals includes chemically precipitated or micronized metal oxides or metals.

* * * * *